(12) United States Patent
Sander

(10) Patent No.: US 6,522,192 B1
(45) Date of Patent: Feb. 18, 2003

(54) BOOST DOUBLER CIRCUIT

(75) Inventor: Wendell B. Sander, Los Gatos, CA (US)

(73) Assignee: Tropian Inc., Cupertino, CA (US)

(*) Notice: Subject to any disclaimer, the term of this patent is extended or adjusted under 35 U.S.C. 154(b) by 0 days.

(21) Appl. No.: 09/688,269

(22) Filed: Oct. 11, 2000

(51) Int. Cl.[7] ............................................... G05F 1/10
(52) U.S. Cl. ................................. 327/536; 363/60
(58) Field of Search ........................ 327/536; 307/110; 363/59, 60

(56) References Cited

U.S. PATENT DOCUMENTS

| | | | | |
|---|---|---|---|---|
| 3,878,449 A | * | 4/1975 | Wilhelmi et al. | 321/15 |
| 4,403,279 A | | 9/1983 | Hirsch | |
| 4,691,271 A | * | 9/1987 | Rosenbaum et al. | 363/60 |
| 4,994,953 A | * | 2/1991 | Haak | 363/71 |
| 5,345,376 A | | 9/1994 | Farhad | |
| 5,350,997 A | * | 9/1994 | Ghotbi et al. | 363/59 |
| 5,565,761 A | | 10/1996 | Hwang | |
| 5,774,348 A | * | 6/1998 | Druce et al. | 363/60 |
| 6,028,418 A | * | 2/2000 | Jovanovic | 363/60 |
| 6,043,610 A | * | 3/2000 | Buell | 315/205 |
| 6,201,717 B1 | * | 3/2001 | Grant | 363/60 |

FOREIGN PATENT DOCUMENTS

| | | |
|---|---|---|
| EP | 0 700 146 | 3/1996 |
| JP | 07123702 | 12/1995 |

\* cited by examiner

*Primary Examiner*—Kenneth B. Wells

(57) ABSTRACT

The present invention, generally speaking, provides a circuit that combines the features of a voltage doubler and a boost regulator to achieve a small and efficient voltage boost regulator. A capacitor is used to provide a primary voltage boost effect. An inductor is used to provide further regulation, either further boost or buck. Instead of requiring non-overlapping clock signals, the relative timing and overlap of the clock signals determines the regulation achieved. The inductor can be made significantly smaller than in comparable boost circuits, facilitating size reduction.

9 Claims, 5 Drawing Sheets

BOOST DOUBLER CIRCUIT

BACKGROUND

1. Field of the Invention

The present invention relates to switched power supplies.

2. Description of Related Art

Voltage doubler circuits are known. Also known are switched power supplies, including "boost" circuits used to generate a voltage higher than a supply voltage and "buck" circuits used to generate a lower voltage.

FIG. 1 illustrates a simple boost circuit that is commonly used to generated a voltage that is greater than the supply voltage Vcc. An inductor L1 is coupled at node 1 of the circuit to a switch SW1 and through the switch to ground. Also coupled to node 1 is a Schottky diode D1. A capacitor C2 is coupled to the output of D1, at which the output voltage VPA of the circuit is produced. The output voltage is applied to a resistive load RL.

In operation, when SW1 is on, a current builds up in L1. When SW1 is then turned off in accordance with, a clock signal T1, the voltage at node 1 will rise until it is caught by (exceeds the forward conduction voltage of) the Schottky diode D1, and the stored energy in the inductor is transferred to C2. For a given load RL, the voltage VPA can be set by the on-time to off-time ratio of the switch SW1. Typically, some form of voltage comparator (not shown) is used to drive a pulse width modulator (not shown) to regulate the voltage VPA. Since energy transfer is accomplished with a reactive device, the efficiency of this type of circuit can be quite high (85% or more) and is limited only by the parasitic resistances, the core loss of the inductor, and the diode drop. Using an additional switch across D1 can further reduce the diode drop loss. The inductor L1, however, can be quite large if a large boltage boost is desired, because the energy required to be stored is correspondingly large.

FIG. 2 illustrates a simple voltage doubler. A capacitor C1 has one plate thereof coupled at node 1 of the circuit to a switch SW1 and through the switch to Vcc. Also coupled to node 1 is a Schottky diode D1. A capacitor C2 is coupled to the output of D1, at which the output voltage VPA of the circuit is produced. The output voltage is applied to a resistive load RL. The other plate of the capacitor C1 is coupled through a switch SW2 to ground and through a switch SW3 to Vcc. Control of switch SW1 and SW2 is ganged.

In operation, SW1 and SW2 are turned on charging C1 to Vcc. SW1 and SW2 are then turned off and SW3 turned on. Since node 1 is Vcc above node 2, when node 2 is switched to Vcc, node 1 will rise to 2 Vcc. This continuing action will cause VPA to rise to 2 Vcc minus the drop across D1, assuming the capacitors C1 and C2 are sufficiently large. A switch can be used in place of D1 to improve efficiency. This circuit can provide a single voltage out at good efficiency; however, any attempt to regulate VPA will result in a loss of efficiency equivalent to adding a linear regulator between C2 and VPA. Also, as shown in FIG. 3, this circuit requires that clocks T1 and T2 be non-overlapping clocks to avoid major loss of efficiency.

What is needed, then, is a voltage regulator circuit, having at least one of a boost mode of operation and buck mode of operation, that overcomes the foregoing disadvantages.

SUMMARY OF THE INVENTION

The present invention, generally speaking, provides a circuit that combines the features of a voltage doubler and a boost regulator to achieve a small and efficient voltage boost regulator. A capacitor is used to provide a primary voltage boost effect. An inductor is used to provide further regulation, either further boost or buck. Instead of requiring non-overlapping clock signals, the relative timing and overlap of the clock signals determines the regulation achieved. The inductor can be made significantly smaller than in comparable boost circuits, facilitating size reduction.

BRIEF DESCRIPTION OF THE DRAWING FIGURES

The present invention may be further understood from the following description in conjunction with the appended drawing figures. In the figures.

DETAILED DESCRIPTION OF THE PREFERRED EMBODIMENTS

Figure 2:
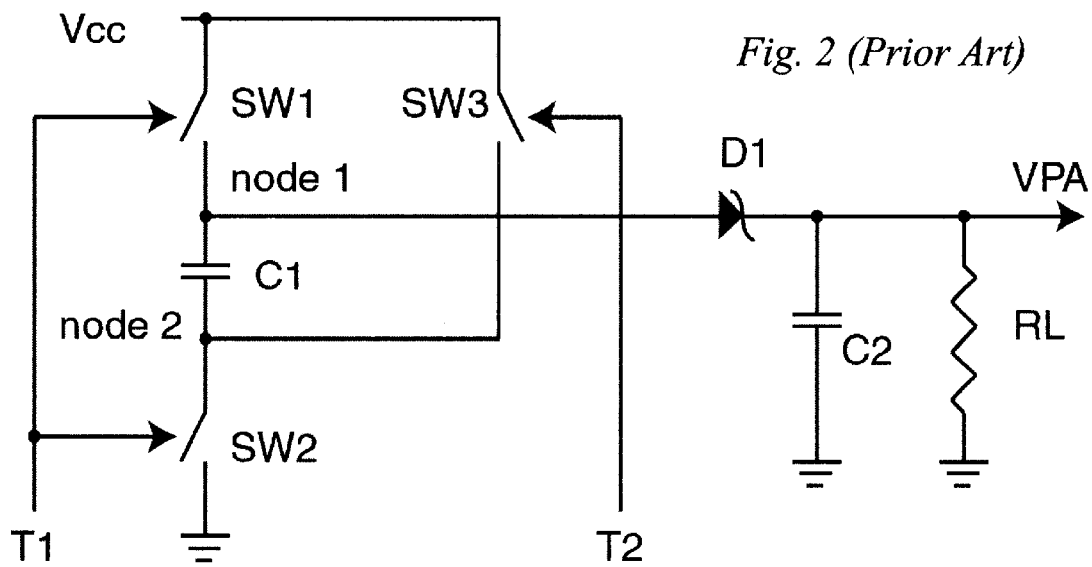
FIG. 2 is a diagram of a known voltage doubler circuit.
Figure 3:
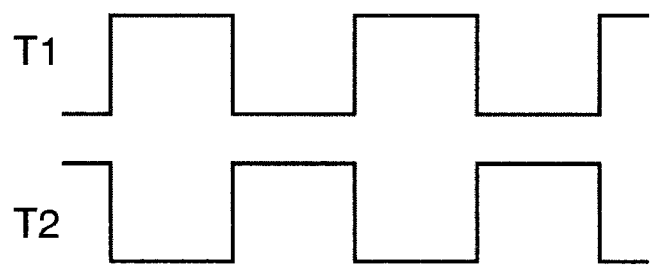
FIG. 3 is a waveform diagram showing clock signals applied to the circuit of FIG. 2.
Figure 4:
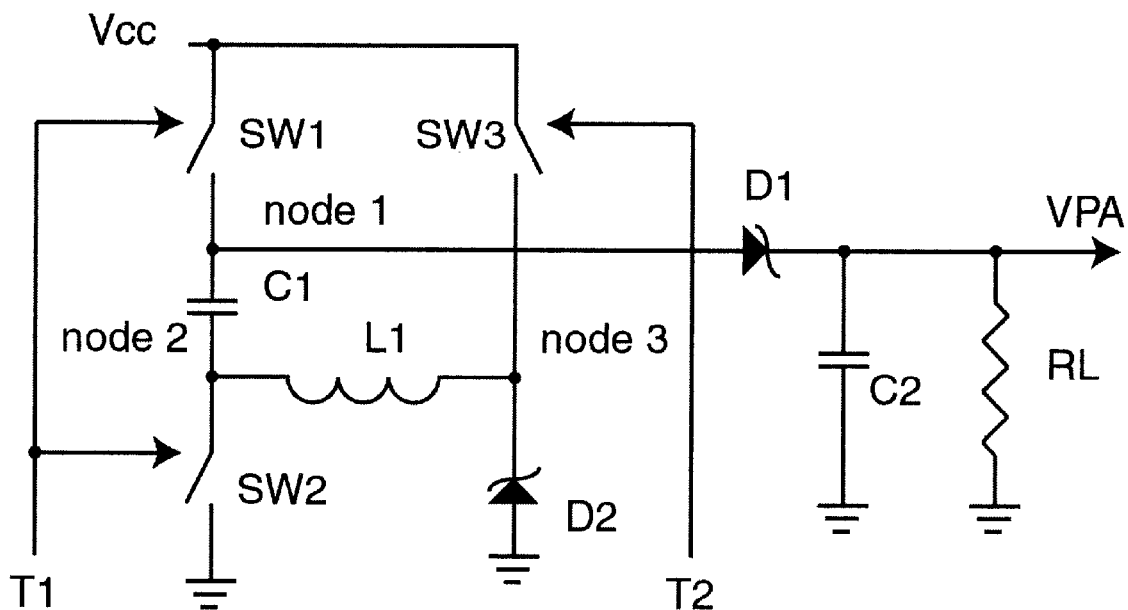
FIG. 4 is a diagram of one embodiment of a voltage regulator circuit.

Referring now to FIG. 4, there is shown a voltage boost regulator circuit in accordance with one embodiment of the present invention. As compared to the doubler circuit of FIG. 2, the circuit of FIG. 4 includes an added inductor L1 coupled between node 2 and node 3 of the circuit and a catch diode (or "free-wheel" diode) D2 coupled from node 3 to ground. If the timing for a simple doubler is used as shown in FIG. 3, then the performance observed is that the output VPA will approach twice Vcc. Note that clock overlap is no longer a problem, since the inductor will prevent significant short circuit currents. (If D1 were enhanced with a switch, however, overlap of SW1 with that switch would still be a problem; hence, for these designs, using only the diode is recommended.)

Figure 1:
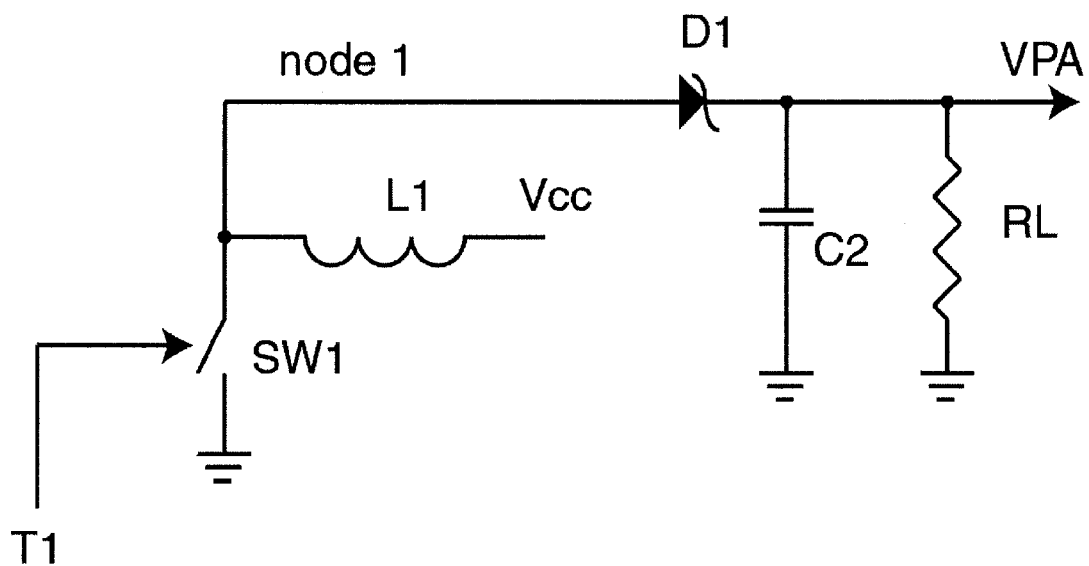
FIG. 1 is a diagram of a known boost configuration switched power supply circuit.
Figure 5:
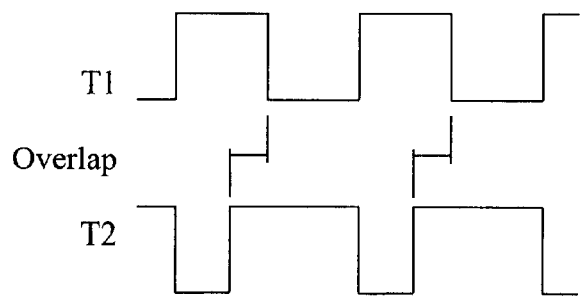
FIG. 5 is a timing diagram illustrating boost operation of the circuit of FIG. 4.

FIG. 5 illustrates introducing a deliberate overlap during which both SW3 and SW2 are turned on. This overlap will cause a current to build up in L1 that is released when SW2 is turned off. The result is that when SW2 is turned off, node 1 is Vcc above node 2 due to the stored charge on C1, and node 2 tries to rise above node 3 due to the inductive kick from L1. As a result, node 1 can rise much higher than 2 Vcc. The circuit behaves much like the circuit of FIG. 1 would act if a battery of Vcc volts were inserted in place of C1 The voltage VPA can now be regulated efficiently by modulating the overlap time.

This circuit has several advantages in a situation where a resulting voltage is desired that is near to or greater than a doubled voltage. Since much of the energy storage for the increased voltage is provided by C1, L1 can have much less energy storage capacity than required for a direct boost circuit. This means that the inductor can be physically much smaller and yet provide all the efficiency advantages of a boost regulator.

Figure 6:
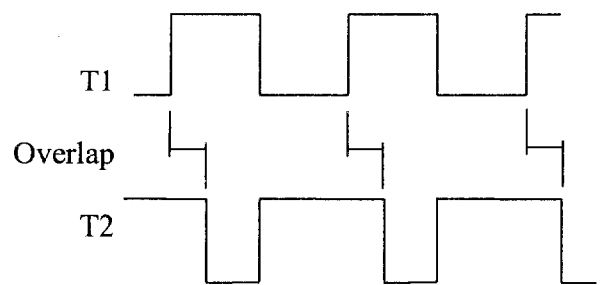
FIG. 6 is a timing diagram illustrating buck operation of the circuit of FIG. 4.

FIG. 6 illustrates timing overlap on a different edge of the timing cycle. In this instance, the timing of the inductive kick lowers the output voltage. A form of buck regulation is thereby provided that can allow VPA to be regulated down to less than half of Vcc with fairly good efficiency. This manner of operation requires that D2 be a Schottky diode, and the efficiency of the circuit will be impacted by both diodes; therefore, for good efficiency, D1 should have a switch across it. The efficiency can still be better than a linear regulator when used as shown.

EXAMPLE

Figure 7:
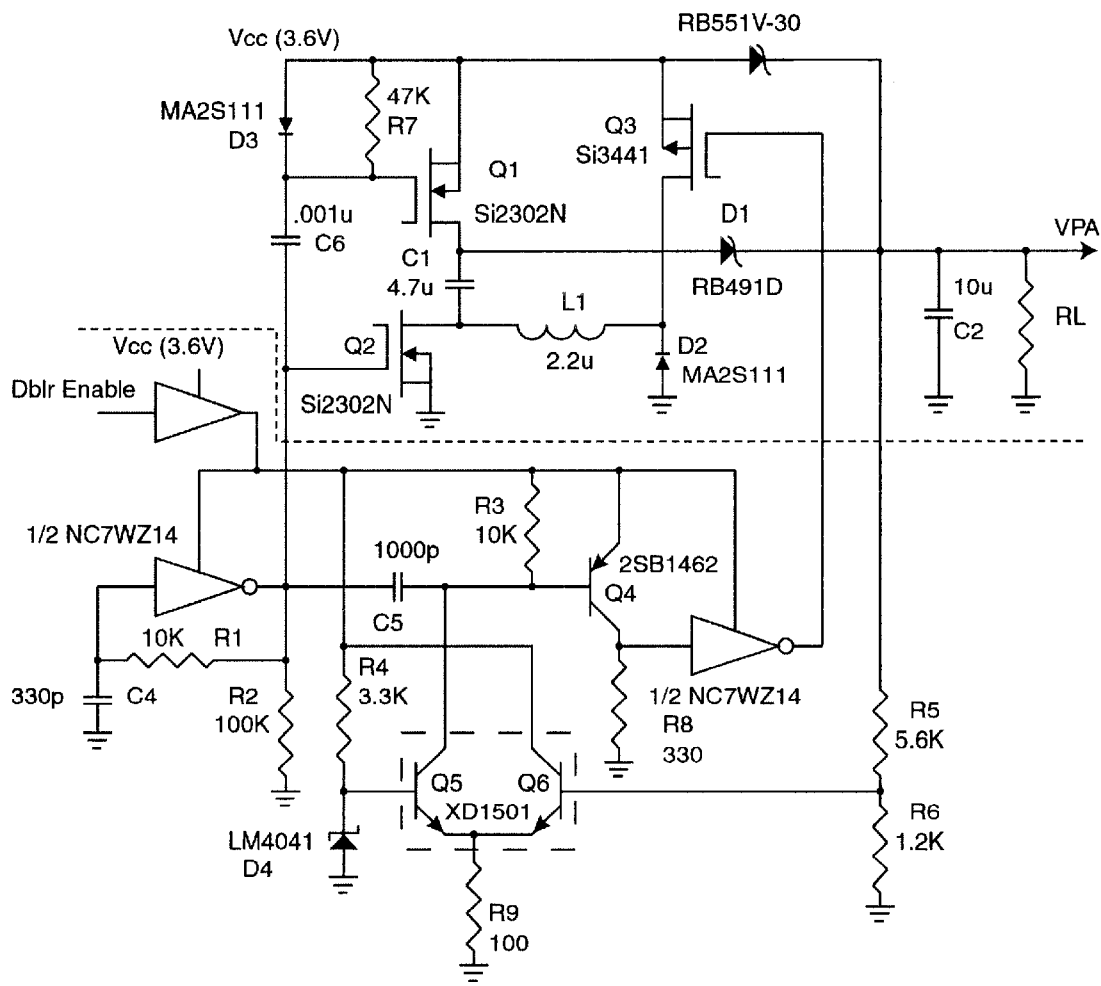
FIG. 7 is a diagram showing in greater detail an embodiment of the present voltage regulator circuit.

FIG. 7 is a voltage boost regulator circuit that was built and tested with RF amplifier integrated circuits of the present assignee. Control of the voltage boost regulator circuit is provided by an oscillator circuit, shown in the lower half of FIG. 7 beneath the dashed line. Design of the oscillator was simplified in that non-overlapping clocks are not required. In this example, the transistor Q4 is used as a simple half-shot pulse width modulator controlled by the current from a differential pair formed by transistors Q5 and Q6. If the current is very low, then Q4 turns off completely, and further voltage reduction is achieved. A diode D4 is provided for greater efficiency. Efficient regulation of the output was observed from about 4 volts to well over 7 volts with a 3.6 volts input voltage. As Vcc was varied from 3 volts to 5 volts, the circuit provided an output voltage of 6.7 to 7 volts into a 10 ohm load. Efficiency was about 77% but could be increased to about 83% by reducing frequency. Further refinement in choice of MOSFETs should allow for better efficiency at a frequency of 250 KHz.

This circuit has less spur problems than the doubler circuit because the inductor and Schottky coupling to the load reduces transients to the output capacitor. The circuit is quite compact, comparable to the doubler circuit.

Figure 8:
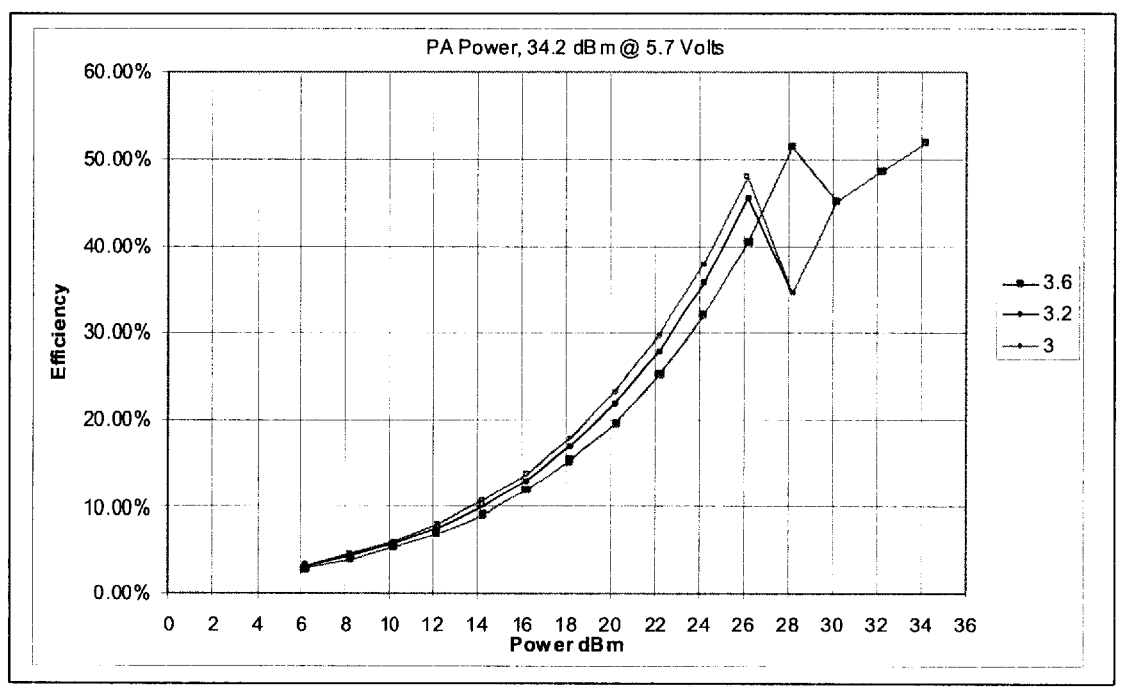
FIG. 8 is a graph illustrating efficiency achieved using the voltage regulator circuit in one specific power amplifier design.
Figure 9:
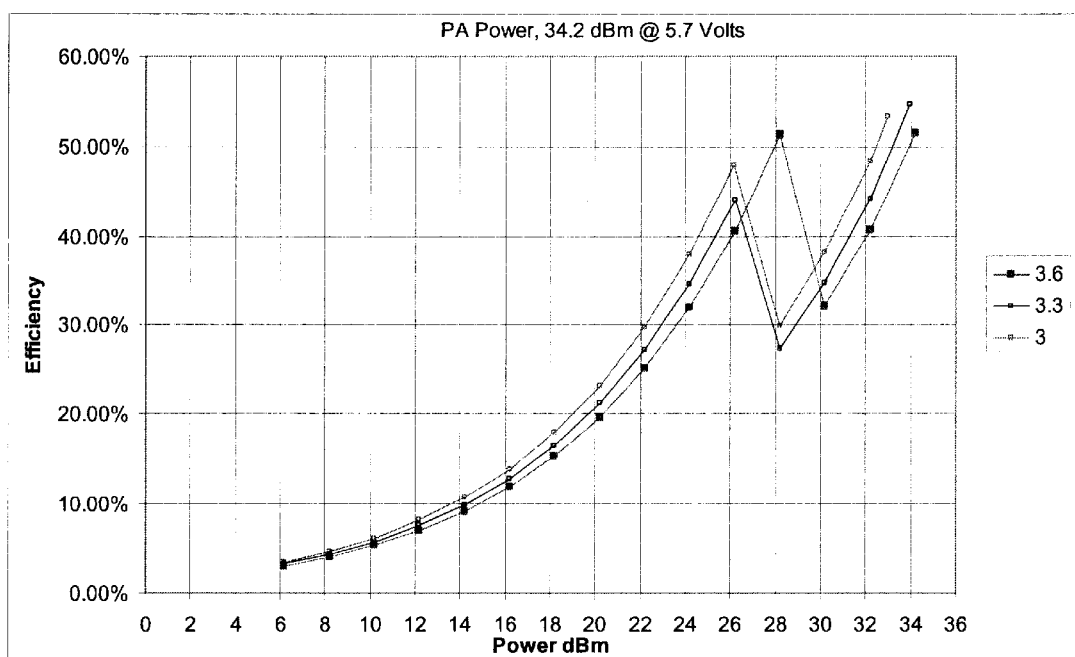
FIG. 9 is a graph illustrating efficiency achieved using a conventional voltage doubler circuit in the same power amplifier design.

FIG. 8 shows the projected efficiency curves of the voltage boost regulator with one power amplifier design. The efficiency curves for a doubler only design with the same power amplifier is shown for comparison in FIG. 9.

Thus, there has been described a voltage boost regulator circuit that achieves the efficiency benefits of conventional circuits of the type described, at the same time providing for ease of regulation and greater ease of integration. Non-overlapping clocks are not required, allowing for a simpler design.

It will be apparent to those of ordinary skill in the art that the present invention can be embodied in other specific forms Without departing from the spirit or essential character thereof. The described embodiments are therefore intended to be in all respects illustrative and not restrictive. The scope of the invention is indicated by the appended claims, rather than the foregoing description, and all changes which come within the meaning and range of equivalents thereof are intended to be embraced therein.

What is claimed is:

1. A DC-to-DC converter for converting a supply voltage to an output voltage, comprising:
   multiple switches including at least a first switch and second switch;
   a controller for controlling the multiple switches;
   a voltage multiplier including a storage capacitor coupled to at least one of the switches for producing a multiplied voltage that is a substantial multiple of the supply voltage in response to the controller controlling the switches during a first phase of operation; and
   a conversion circuit including an inductor coupled to at least one of the switches for applying boost or buck to the multiplied voltage to produce the output voltage on a power output line in response to the controller controlling the switches during a second subsequent phase of operation.

2. The apparatus of claim 1, wherein the second switch is closed for a period of time prior to opening of the first switch, whereby boost operation is achieved.

3. The apparatus of claim 1, wherein the first switch is closed for a period of time prior to opening of the second switch, whereby buck operation is achieved to produce a voltage between one and two times a supply voltage.

4. The apparatus of claim 1, wherein one plate of the storage capacitor is coupled to the first switch and another plate of the storage capacitor is coupled to a third switch, and wherein the first switch and the third switch open at the same time and close at the same time.

5. The apparatus of claim 4, wherein the inductor is coupled through the second switch to an operational voltage and through one of the first switch and the third switch to a reference voltage.

6. The apparatus of claim 5, further comprising a free-wheel diode coupled to the inductor.

7. The apparatus of claim 1, further comprising one of a switch and a diode having a breakdown voltage, coupled in series with the power output line.

8. The apparatus of claim 1, further comprising a capacitor coupled to the power output line and to a reference voltage.

9. The apparatus of claim 1, further comprising a resistive load coupled to the power output line and to a reference voltage.

* * * * *